United States Patent
Plank S. et al.

(10) Patent No.: US 10,671,279 B2
(45) Date of Patent: Jun. 2, 2020

(54) INTERACTIVE VIRTUAL KEYBOARD CONFIGURED TO USE GESTURES AND HAVING CONDENSED CHARACTERS ON A PLURALITY OF KEYS ARRANGED APPROXIMATELY RADIALLY ABOUT AT LEAST ONE CENTER POINT

(71) Applicant: Thumba Inc., San Francisco, CA (US)

(72) Inventors: Andras Plank S., Walnut Creek, CA (US); Gabor A. Rab, Budapest (HU)

(73) Assignee: Thumba Inc., San Francisco, CA (US)

( * ) Notice: Subject to any disclaimer, the term of this patent is extended or adjusted under 35 U.S.C. 154(b) by 0 days.

(21) Appl. No.: 16/030,716

(22) Filed: Jul. 9, 2018

(65) Prior Publication Data
US 2019/0018589 A1    Jan. 17, 2019

Related U.S. Application Data

(60) Provisional application No. 62/530,847, filed on Jul. 11, 2017.

(51) Int. Cl.
*G06F 3/0488* (2013.01)
*G06F 3/0482* (2013.01)

(52) U.S. Cl.
CPC ........ *G06F 3/04886* (2013.01); *G06F 3/0482* (2013.01); *G06F 3/04883* (2013.01)

(58) Field of Classification Search
CPC . G06F 3/04886; G06F 3/0482; G06F 3/04883
See application file for complete search history.

(56) References Cited

U.S. PATENT DOCUMENTS

| | | | | |
|---|---|---|---|---|
| 9,035,888 B1* | 5/2015 | DeLatorre | ........... | G06F 3/04886 345/173 |
| 2006/0085757 A1* | 4/2006 | Andre | ..................... | G06F 3/041 715/771 |
| 2007/0256029 A1* | 11/2007 | Maxwell | ............... | G06F 3/0482 715/834 |
| 2010/0073329 A1* | 3/2010 | Raman | .................. | G06F 3/0233 345/177 |
| 2012/0075194 A1* | 3/2012 | Ferren | ................ | G02B 13/0065 345/168 |
| 2012/0162078 A1* | 6/2012 | Ferren | ................. | G06F 3/04886 345/168 |

(Continued)

FOREIGN PATENT DOCUMENTS

HU    P1100505 A2    4/2013

OTHER PUBLICATIONS

Wikipedia, "T9 (predictive text)" Wikipedia, Apr. 2018, 3 pages retrieved from https://en.wikipedia.org/wiki/T9_(predictive_text).

*Primary Examiner* — Stephen G Sherman
(74) *Attorney, Agent, or Firm* — Zilka-Kotab, P.C.

(57) ABSTRACT

A method according to one embodiment includes detecting a touch event on a touch-sensitive input area of a display. The touch event includes a gesture. The touch-sensitive input area has groups of virtual ambiguous keys arranged approximately radially about a center point. The method further includes determining at least one character from at least one of the virtual ambiguous keys selected by the gesture. The method further includes outputting the determined at least one character on the display.

18 Claims, 6 Drawing Sheets

(56) References Cited

U.S. PATENT DOCUMENTS

| | | | |
|---|---|---|---|
| 2013/0234949 A1* | 9/2013 | Chornenky | G06F 3/0216 345/169 |
| 2014/0082546 A1* | 3/2014 | Yang | G06F 3/04886 715/773 |
| 2014/0098024 A1* | 4/2014 | Paek | G06F 3/04886 345/168 |
| 2014/0098036 A1* | 4/2014 | Paek | G06F 3/023 345/173 |
| 2015/0026624 A1* | 1/2015 | Hui | G06F 3/04886 715/773 |
| 2016/0062632 A1* | 3/2016 | Adams | G06F 3/04886 715/763 |

* cited by examiner

INTERACTIVE VIRTUAL KEYBOARD CONFIGURED TO USE GESTURES AND HAVING CONDENSED CHARACTERS ON A PLURALITY OF KEYS ARRANGED APPROXIMATELY RADIALLY ABOUT AT LEAST ONE CENTER POINT

RELATED APPLICATIONS

This application claims priority to U.S. Provisional Patent Appl. No. 62/530,847, filed on Jul. 11, 2017 and entitled "Touch-based reduced virtual keyboard for eyes-free handling" and which is herein incorporated by reference.

FIELD OF THE INVENTION

The present invention relates to text input systems, and more particularly, this invention relates to interactive touch-based virtual keyboards.

BACKGROUND

Currently, touch-based input methods, such as touch-screen keyboards typically used on touchscreen devices, are widely utilized. These virtual keyboards are usually oriented in accordance with a "QWERTY" keyboard layout (or its variations) consisting of dozens of small virtual keys spread usually uniformly across a particular displayed keyboard.

These virtual keyboard implementations however often provide only limited typing comfort. For example, when holding a device displaying such a keyboard, some keys typically reside out of reach of a user's fingers, and therefore a user is forced to frequently adjust handling orientations of the device in order to utilize the keyboard, which results in reduced typing speeds. Moreover, a user may unintentionally drop the device displaying the virtual keyboard while adjusting handling orientation of the device, which may result in significant damage and/or loss of functionality of the device.

Furthermore, because virtual keys of conventional virtual keyboards are often small in size (such as to fit each of the 26 letters of the English alphabet on different keys) relative to the average human thumb (which is often used to select virtual keys), typing accuracy is often compromised on conventional virtual keyboards.

SUMMARY

A method according to one embodiment includes detecting a touch event on a touch-sensitive input area of a display. The touch event includes a gesture. The touch-sensitive input area has groups of virtual ambiguous keys arranged approximately radially about a center point. The method further includes determining at least one character from at least one of the virtual ambiguous keys selected by the gesture. The method further includes outputting the determined at least one character on the display.

A computer program product according to one embodiment includes a computer readable storage medium having stored thereon computer readable program instructions configured to cause a processor of a computer system to output a group of virtual ambiguous keys arranged approximately radially about a center point to a display having a touch-sensitive input area, and detect a touch event on the touch-sensitive input area of the display, the touch event including a gesture. The computer readable program instructions are further configured to cause a processor of a computer system to receive a starting location and an ending location of the gesture, and output at least one character from at least one of the virtual ambiguous keys on the display. The at least one character is determined from the starting location and the ending location of the gesture.

A system according to one embodiment includes a display. The display includes a touch-sensitive input area for touch events. The system further includes a processor, and logic integrated with and/or executable by the processor. The logic is configured to output on the touch-sensitive input area of the display a first group of virtual ambiguous keys arranged approximately radially about a center point. The first group of virtual ambiguous keys are divided among a predetermined number of rows, and each of the virtual ambiguous keys of the first group extend circumferentially along the row associated therewith. The logic is further configured to output on the touch-sensitive input area of the display a second group of virtual ambiguous keys arranged approximately radially about a second center point. The second group of virtual ambiguous keys are divided among a predetermined number of rows, and each of the virtual ambiguous keys of the second group extend circumferentially along the row associated therewith.

Other aspects and advantages of the present invention will become apparent from the following detailed description, which, when taken in conjunction with the drawings, illustrate by way of example the principles of the invention.

DETAILED DESCRIPTION

Figure 1:
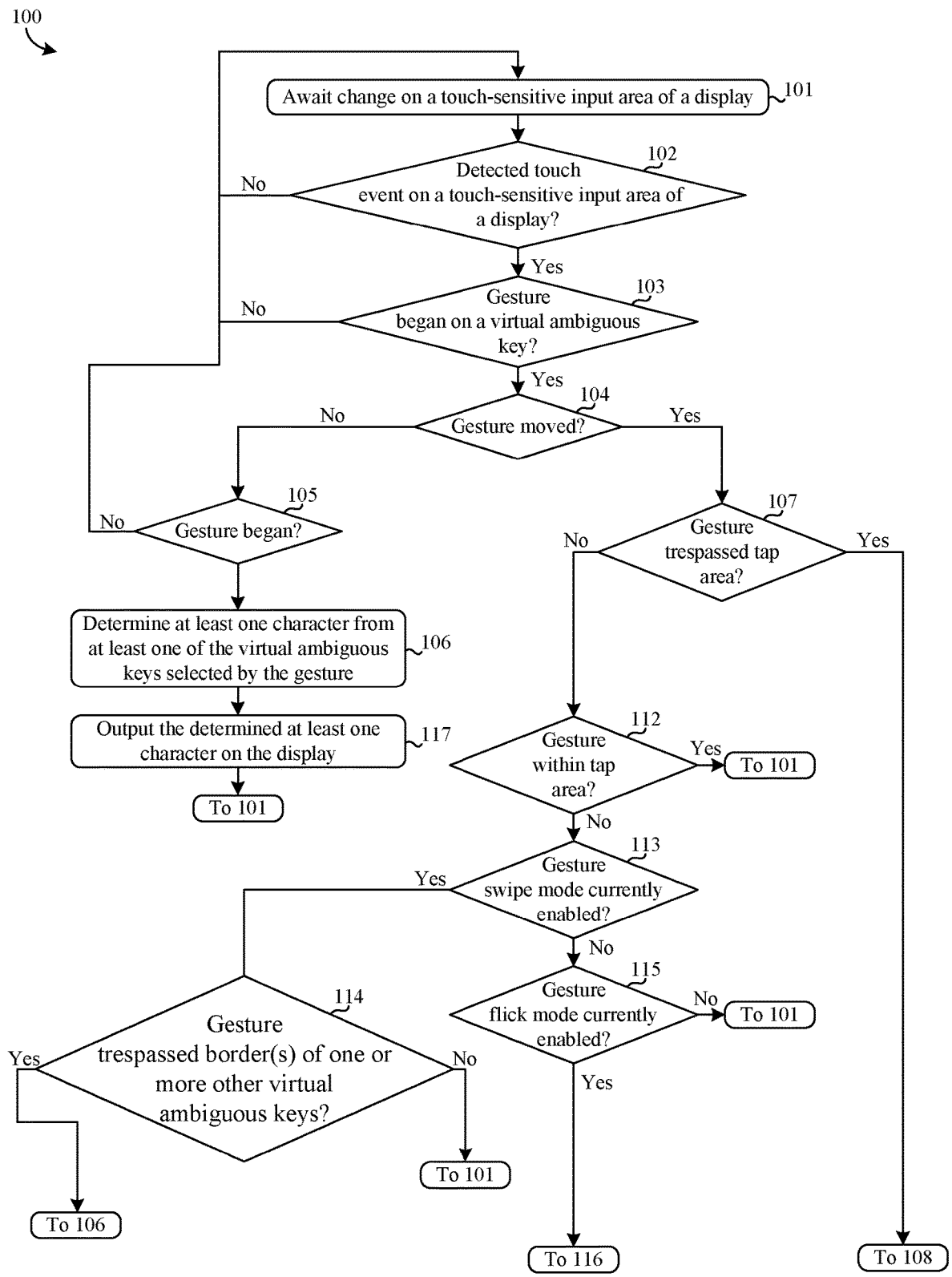
FIG. 1 is a flowchart of a method, in accordance with one embodiment.
Figure 1:
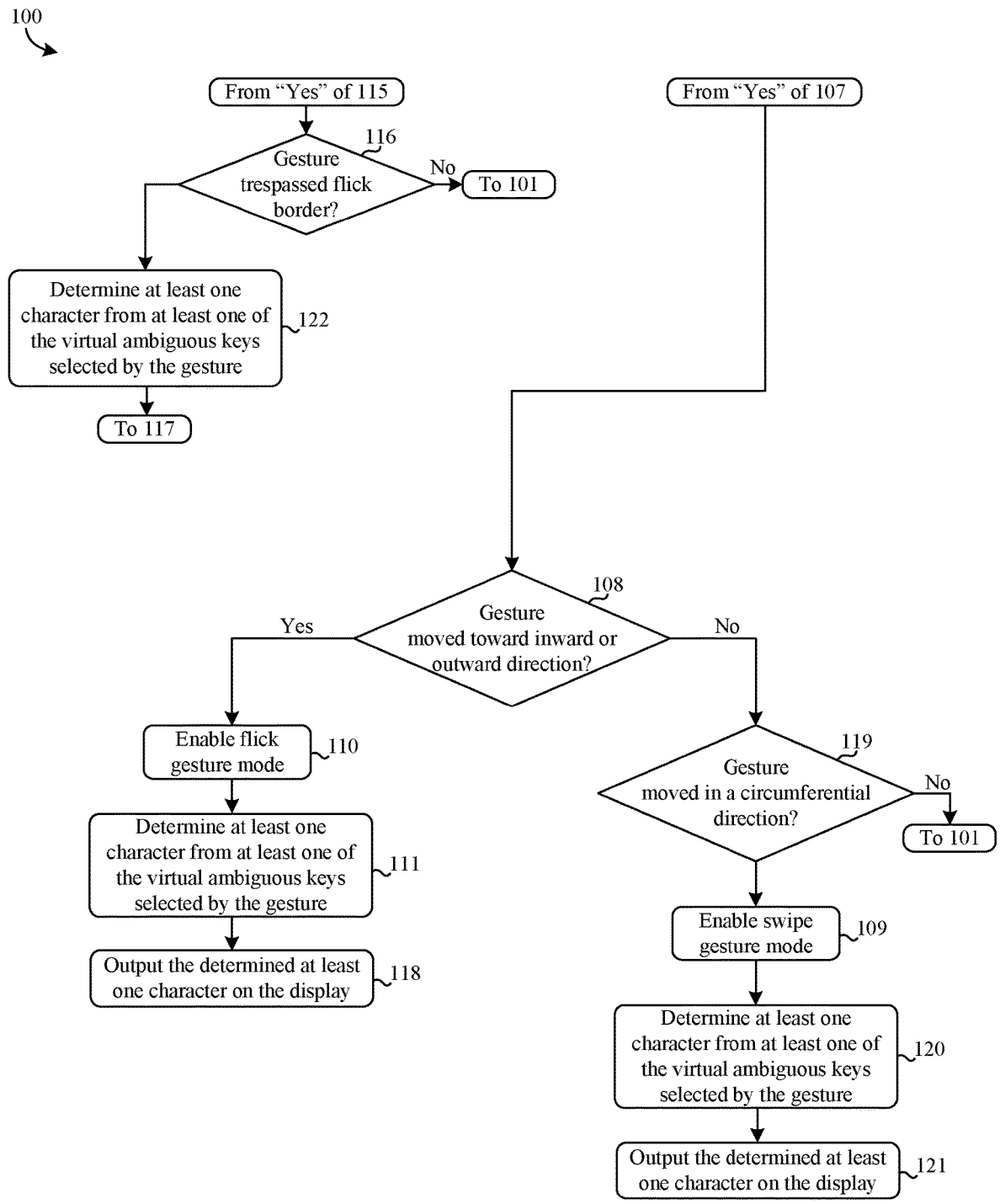

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of interactive touch-based virtual keyboards having groups of virtual ambiguous keys configured for gesture inputs and/or related systems and methods.

In one general embodiment, a method includes detecting a touch event on a touch-sensitive input area of a display. The touch event includes a gesture. The touch-sensitive input area has groups of virtual ambiguous keys arranged approximately radially about a center point. The method further includes determining at least one character from at least one of the virtual ambiguous keys selected by the gesture. The method further includes outputting the determined at least one character on the display.

In another general embodiment, a computer program product includes a computer readable storage medium having stored thereon computer readable program instructions configured to cause a processor of a computer system to output a group of virtual ambiguous keys arranged approximately radially about a center point to a display having a touch-sensitive input area, and detect a touch event on the touch-sensitive input area of the display, the touch event including a gesture. The computer readable program instructions are further configured to cause a processor of a computer system to receive a starting location and an ending location of the gesture, and output at least one character from at least one of the virtual ambiguous keys on the display. The at least one character is determined from the starting location and the ending location of the gesture.

In yet another general embodiment, a system includes a display. The display includes a touch-sensitive input area for touch events. The system further includes a processor, and logic integrated with and/or executable by the processor. The logic is configured to output on the touch-sensitive input area of the display a first group of virtual ambiguous keys arranged approximately radially about a center point. The first group of virtual ambiguous keys are divided among a predetermined number of rows, and each of the virtual ambiguous keys of the first group extend circumferentially along the row associated therewith. The logic is further configured to output on the touch-sensitive input area of the display a second group of virtual ambiguous keys arranged approximately radially about a second center point. The second group of virtual ambiguous keys are divided among a predetermined number of rows, and each of the virtual ambiguous keys of the second group extend circumferentially along the row associated therewith.

Conventional keyboards, and particularly conventional virtual keyboards, commonly implement a standard "QWERTY" keyboard layout (or its variations) configured for typing thereon. For a user, these keyboards are often difficult to type on. This is because the each of the characters of such keyboards are often designated to a different key of the keyboard, which together constitute a vast plurality of spaced keys.

Accordingly, such conventional virtual keyboard implementations often provide only limited typing comfort. Moreover, users are prone to dropping the device displaying such conventional keyboards, such as while standing and typing on a device displaying the conventional virtual keyboard, as a result of having to adjust the handling orientation of the device while typing to reach such keys. This can be very expensive, as dropping such devices often results in significant damage and/or loss of functionality of the device being typed on. Learning how to type on such conventional keyboards is also no easy task, and often takes months if not years to develop proficiency at.

Various embodiments described herein include implementing virtual ambiguous keys arranged approximately radially about at least one center point of a display for enabling easy to learn, efficient typing thereon. Such virtual ambiguous keys are notably configured for utilizing gesture text inputs for enabling such efficient typing.

FIG. 1 show method 100 for facilitating efficient typing on a keyboard, in accordance with one embodiment. As an option, the present method 100 may be implemented to devices such as those shown in the other FIGS. described herein. Of course, however, such method 100 and others presented herein may be used for facilitating efficient text input on a device which may or may not be related to the illustrative embodiments listed herein. Further, the methods presented herein may be carried out in any desired environment. Moreover, more or less operations than those shown in FIG. 1 may be included in method 100, according to various embodiments. It should also be noted that any of the aforementioned features may be used in any of the embodiments described in accordance with the various methods.

It should be noted that various operations of method 100 will be described herein to be performed on a display, e.g., such as a display of a device. According to various approaches, the display may be any known type of display. For example, the display may preferably be a touch-sensitive display. Various examples of such devices and/or displays will be described in other various approaches and/or embodiments described elsewhere herein, e.g., see FIGS. 2-7.

It should be prefaced however, that in various approaches, method 100 may be implemented on a computer system having one or more processors operatively coupled to a memory component with at least one electronic visual display that is configured for displaying text and editing text, referred to collectively herein as a computer, and is connected to via wireless or wired connection, or incorporates, a touch-sensitive input interface that embodies a plurality of virtual ambiguous keys, that can be utilized for inputting text to the computer. In some approaches, the computer can be a wired communication device (for example, a laptop computer having a touch screen); a mobile or handheld wireless communication devices such as cellular phones, smartphones, wireless organizers, personal digital assistants, wirelessly enabled notebook, tablets and similar devices; a computer without wireless communication capabilities, such as a handheld electronic game device, game controller, digital photograph album, digital camera; or any other device.

Operation 101 of method 100 includes awaiting change on a touch-sensitive input area of a display. For descriptive purposes, a change on a touch-sensitive input area of a display may include receiving (on the touch-sensitive input area of a display) any type of input. For example, in one approach, a received input may include a touch event. In various more specific approaches, a touch event may be initiated in response to detecting that an object, e.g., a surface of a user's finger, a plastic tipped stylus, an electronic device, etc., coming into contact with a touch-sensitive input area of a display.

Accordingly, method 100 includes detecting a touch event on a touch-sensitive input area of a display, e.g., see decision 102.

Although in some approaches, a touch event may begin with contact being initially made with the touch-sensitive input area of a display, the touch event may include a gesture. For example, according to various approaches, the detected touch event may include an initial touching of the touch-sensitive input area of the display, and moreover may include any detected continued touching of the touch-sensitive input area of the display thereafter. Accordingly, a gesture may include a starting location and an ending location.

Accordingly, detecting the touch event may include determining a starting location of the gesture on the touch-sensitive input area, and an ending location of the gesture on the touch-sensitive input area. In one approach, the starting location of the gesture on the touch-sensitive input area may be the location at which the touch event was initially detected. Moreover, in another approach, the ending location of the gesture on the touch-sensitive input area may be a location at which the touch event was last detected.

One or more touch events may be associated with typing on the touch-sensitive input area of the display. Accordingly, the touch-sensitive input area may include groups of virtual ambiguous keys arranged approximately radially about a center point. For reference, use of the term "ambiguous" of virtual ambiguous key(s) is intended to correspond to such keys including any predetermined characters. For example, the virtual ambiguous keys may include any number (preferably at least two) of characters, e.g., letters, numbers, emojis, etc. It should be noted that such characters may be modified to include any known characters of any known language and/or type.

In another preferred approach, the number of characters assigned to a particular virtual ambiguous key may be three or four. In other approaches, the number of characters assigned to a particular virtual ambiguous key may be two to five. For example, a virtual ambiguous key including the characters "ABC" is associated to a key identifier sequence that is associated to either "a", "b" or "c" characters. This key is also associated to characters "a", "b" and "c". In a preferred approach eight virtual ambiguous keys may include the characters: "ABC", "DEF", "GHI", "JKL", "MNO", "PQRS", "TUV", and "WXYZ". In other approaches, these associations can be of any set of characters or phrases or syllabics of any language, for example German characters or japan syllabics. In some approaches, displayed characters and the set of characters of the key identifier sequence are not the same. For example, in some languages with different accent on the vowels, a virtual ambiguous key may include the characters "ABC" but the associated set of characters and the associated set of characters of the key identifier sequence may be "a", "á", "b" and "c".

The at least one center point may be located at any location on the touch-sensitive input area of the display. However, in preferred approaches, the center point is located spaced from the corner (away from the display) at about the position of the thumb joint when engaged in typing on the touch-sensitive input area. Positioning the center point spaced from the corner at about the position of the thumb joint when engaged in typing on the touch-sensitive input area allows for a user that utilizes the corners of the display when holding the display to easily select any one or more of the virtual ambiguous keys during associated touch events. For example, in response to the center point being located at about the expected position of a thumb joint, e.g., interphalangeal thumb joint, of a user when the user is engaged in typing on the touch-sensitive input area, the groups of virtual ambiguous keys arranged approximately radially about the center point, may be contacted, e.g., during a touch event, and thereby selected by a user typing on the touch-sensitive input area.

It should be noted that the particular corners of the display at which the center points are spaced from may depend and/or be changed in response to the device (on which method 100 is being performed) rotating. For example, in one approach, in response to determining, e.g., using an accelerometer, that a device including the display has been rotated, the overall configuration of the display may also be rotated on the display, e.g., and spaced according to the change in display spacing (if any).

Various operations of method 100 may be used to determine at least one character from at least one of the virtual ambiguous keys selected by the gesture, as will now be described.

Decision 103 of method 100 includes determining whether the gesture began on a virtual ambiguous key, e.g., a first virtual ambiguous key. According to one approach, in response to determining that the gesture began on a first virtual ambiguous key, the location on the first virtual ambiguous key may be determined to be the starting location of the gesture.

In some approaches, the starting location and the ending location of the gesture may be in about the same locations on the touch-sensitive input. For example, assume that in one approach, a first virtual ambiguous key includes the characters "A B C." In such an approach, further assume that a user wants to enter the word "A," such as to begin a sentence. Accordingly, the starting location and the ending location of the gesture may be about at the same location on the first virtual ambiguous key.

Accordingly, decision 104 of method 100 includes determining whether the gesture has moved. In one approach, determining whether the gesture has moved may include determining whether the starting location and the ending location of the gesture are less than or equal to within a predetermined distance of one another. In another approach, determining whether the gesture has moved may include determining whether the starting location and the ending location of the gesture are greater than a predetermined distance of one another.

In response to determining that the gesture did not move (as illustrated by the "No" logical path of decision 104), it may be determined whether the gesture began, e.g., see decision 105. In one approach, determining whether the gesture began may include determining whether the gesture constituted an accidental touch event. For example, using the example above, it may be determined that the first virtual ambiguous key was accidentally tapped and/or the detected touch event was made in error.

Accordingly, if it is determined that the gesture did not begin (as illustrated by the "No" logical path of decision 105), operation 101 may be performed, e.g., thereby awaiting for a subsequent touch event. However, if it is determined that the gesture did begin, method 100 may include determining at least one character from at least one of the virtual ambiguous keys selected by the gesture. According to various approaches, determining at least one character from at least one of the virtual ambiguous keys selected by the gesture may include accessing a known list, e.g., database, word list, character list, etc., which may be used for determining character selections based on selections of a gesture. Such known list(s) may include information correlating each virtual ambiguous key with an associated one or more key identifier sequences (determined from the detected touch event) and/or some set of characters of the virtual ambiguous key.

According to various approaches, the virtual ambiguous keys may include any number of characters. For example, in preferred approaches, one or more of the virtual ambiguous keys may include three or four characters. In other approaches, the virtual ambiguous keys may include two to five characters. For example, a virtual ambiguous keys including the characters "ABC" may be associated to a key identifier sequence that is associated to any of the "a", "b" or "c" characters. The virtual ambiguous key may also be associated with characters "a", "b" and "c".

In a preferred approach, for the English language, the following groups of characters: "ABC", "DEF", "GHI", "JKL", "MNO", "PQRS", "TUV", and "WXYZ" may be associated with eight different virtual ambiguous keys (respectively). In other approaches, one or more virtual ambiguous keys may include any sets of, e.g., characters, phrases, syllabics of any language, e.g., such as German characters, Japanese syllabics, French characters, etc. In some approaches, characters determined from the gesture may not match the characters displayed on the virtual ambiguous keys. For example, in one approach, to accommodate languages with different accented characters, a virtual ambiguous key may be labeled with the group of characters "ABC", however, the determined at least one character from at least one of the virtual ambiguous keys selected by the gesture may include any one or more of: "a", "á", "b" and/or "c", etc.

With continued reference to method 100, in one approach, in response to determining that the gesture began, e.g., the detected touch event was made not made in error, at least one character from at least one of the virtual ambiguous keys selected by the gesture may be determined, e.g., see operation 106. Moreover, the gesture may be determined to be intended as a tap gesture, e.g., for selecting a single letter for outputting to the display, e.g., see operation 117.

Method 100 further includes outputting the determined at least one character on the display. It should be noted that any output characters may be updated at any time. For example, to delete any one or more characters that were output on the display, the touch-sensitive input area of the display may include a delete key (which may also preferably arranged approximately radially about the center point).

Referring again to decision 104, in response to determining that the gesture did move (as illustrated by the "Yes" logical path of decision 104), it may be determined whether the gesture trespassed a tap area, e.g., see decision 107. According to various approaches, a tap area include any predetermined amount of area that surrounds the starting location of the gesture. Moreover, the tap area may include a frame defining the outer circumference of the tap area. For example, in one approach, a tap area may include a predetermined circle of area, where the starting location of the gesture is located in the center of the circular shaped tap area, and the outermost circumference of the tap area includes the frame, e.g., circular line defining the bounds of the tap area. In some approaches, tap areas may prevent unintentional finger movement from being translated to the selection of more than one character, provided that the gesture does not traverse from the starting location to outside of the tap area. Accordingly, tap areas may make a tap gesture easier and more convenient to perform, because a user's unintentional finger movement that remains within the tap area will not be translated to more than one character being unintentionally determined in method 100.

In other approaches, the tap area, and particularly a border of the tap area may be output on the display to for, e.g., preventing accidental cancelling of a tap state, providing easier and more convenient usability of the virtual ambiguous keys, clarifying optional functionality boundaries of the virtual ambiguous keys, etc.

In response to determining that the gesture trespassed the tap area (as illustrated by the "Yes" logical path of decision 107), method 100 may include enabling and/or disabling one or more gesture modes. In a more specific approach, a determination that the gesture trespassed the tap area may be at least partially based on the starting location of the gesture being within the tap area and the ending location of the gesture not being within the tap area. A resulting enabling and/or disabling of one or more gesture modes may be performed for purposes of streamlining text input on the touch-sensitive input for a user. For example, according to various approaches, swipe and/or flick gesture modes may be enabled and/or disabled. For descriptive purposes, general descriptions of swipe and flick gestures operations, as well operational steps for enabling and/or disabling such modes will now be described.

As previously mentioned, as well as described elsewhere herein, in various approaches, gestures may be initiated on a virtual ambiguous key. For example, the gesture may be first detected as a tap, or at least an initially detected touch event. The initial tap location may be determined to be a starting location of the gesture, and moreover a tap area may be defined around the starting location of the gesture. In some approaches, in response to determining that the gesture trespasses the frame of the tap area, depending on a direction of the gesture (a directional path that the gesture takes from the starting location to the ending location), a new gesture mode may be activated. Moreover, in some approaches, the tap area may be additionally and/or alternatively cancelled.

According to various preferred approaches, in response to determining that the direction of the gesture, after trespassing the frame of the tap area, extends in an outward or inward radial direction with respect to the center point, a flick gesture mode may be enabled, e.g., see decision 108 and operation 110.

It should be noted that in some approaches, in response to the tap area being trespassed by the gesture, the tap area may be forgotten, e.g., no longer output on the display. Accordingly, any re-entering of what was previously the tap area may not re-create the tap area and/or may not allow determining of a character with respect to the tap area, during a current gesture.

Method 100 further includes enabling a swipe gesture mode, e.g., see operation 109. For example, according to various preferred approaches, in response to determining that the direction of the gesture, after trespassing the frame of the tap area, does not extend in an outward or inward radial direction with respect to the center point, it may be determined whether, after trespassing the frame of the tap area, the direction of the gesture moves in a circumferential direction, e.g., see decision 119. In response to detecting that, after trespassing the frame of the tap area, the direction of the gesture moves in a circumferential direction (circumferential gesture transitions), a swipe gesture mode may be enabled, e.g., see "Yes" logical path of decision 119 and operation 109. As will become apparent upon reading various descriptions herein, detected circumferential gesture transitions of a gesture may be used for determining at least one character from at least one of the virtual ambiguous keys.

It should be noted that in one approach, in response to a first gesture mode already being enabled, an enabling of a second gesture mode may disable the first gesture mode. Moreover, in other approaches, in response to a first gesture mode already enabled, an enabling of a second gesture mode may allow each of the two or more gesture modes to remain enabled for any period of time and/or until one or more of the gesture modes are selectively disabled.

Moreover, it should be noted that in some optional approaches, the currently enabled gesture mode may be changed to another gesture mode in response to detecting a sudden transition of the gesture's directional path. For example, where a most recent detected portion of a gesture path extends in a radial direction, in response to next detecting that the gesture path transitions to a circumferential direction, a currently enabled gesture mode may be disabled and a different gesture mode may be enabled. In contrast, according to another example, where a most recent detected portion of a gesture path extends in a circumferential direction, in response to next detecting that the gesture path transitions to a radial direction (with respect to the center point), a currently enabled gesture mode may be disabled and a different gesture mode may be enabled.

Moreover, in some approaches, locations along the touch sensitive input of the display that are contacted during a swipe gesture may be at least temporarily recorded/stored as a series of points that represent a path. These locations may be at least temporarily recorded/stored for determining at least one character selected by the gesture. For example, a swipe gesture may include any number of detected touch event points that begin with the starting location of the gesture and proceed to the ending location of the gesture. It should be noted that any of such points and/or directional information corresponding to the gesture may be used for determining at least one character from at least one of the virtual ambiguous keys selected by the gesture. For example, in one approach, with the swipe gesture mode enabled, at least one of the determined characters may include a character of a first of the virtual ambiguous keys and a character of a second of the virtual ambiguous keys in response to the starting location of the gesture being located on the first virtual ambiguous key, and the ending location of the gesture not being located on the first virtual ambiguous key, e.g., see FIG. 4.

In one approach, the swipe gesture may include the ending location of the gesture may be located on the second virtual ambiguous key.

In another approach, the ending location may not be located on a second virtual ambiguous key, but at least one of the determined characters is of the second virtual ambiguous key. In such an approach, the determined character may be selected in response to the gesture including a swipe from the starting location to the ending location, where the swipe from the starting location to the ending location transitions toward the second virtual ambiguous key. Accordingly, the transition toward the second virtual ambiguous key may be recognized and considered in determined the at least one character.

Figure 4:
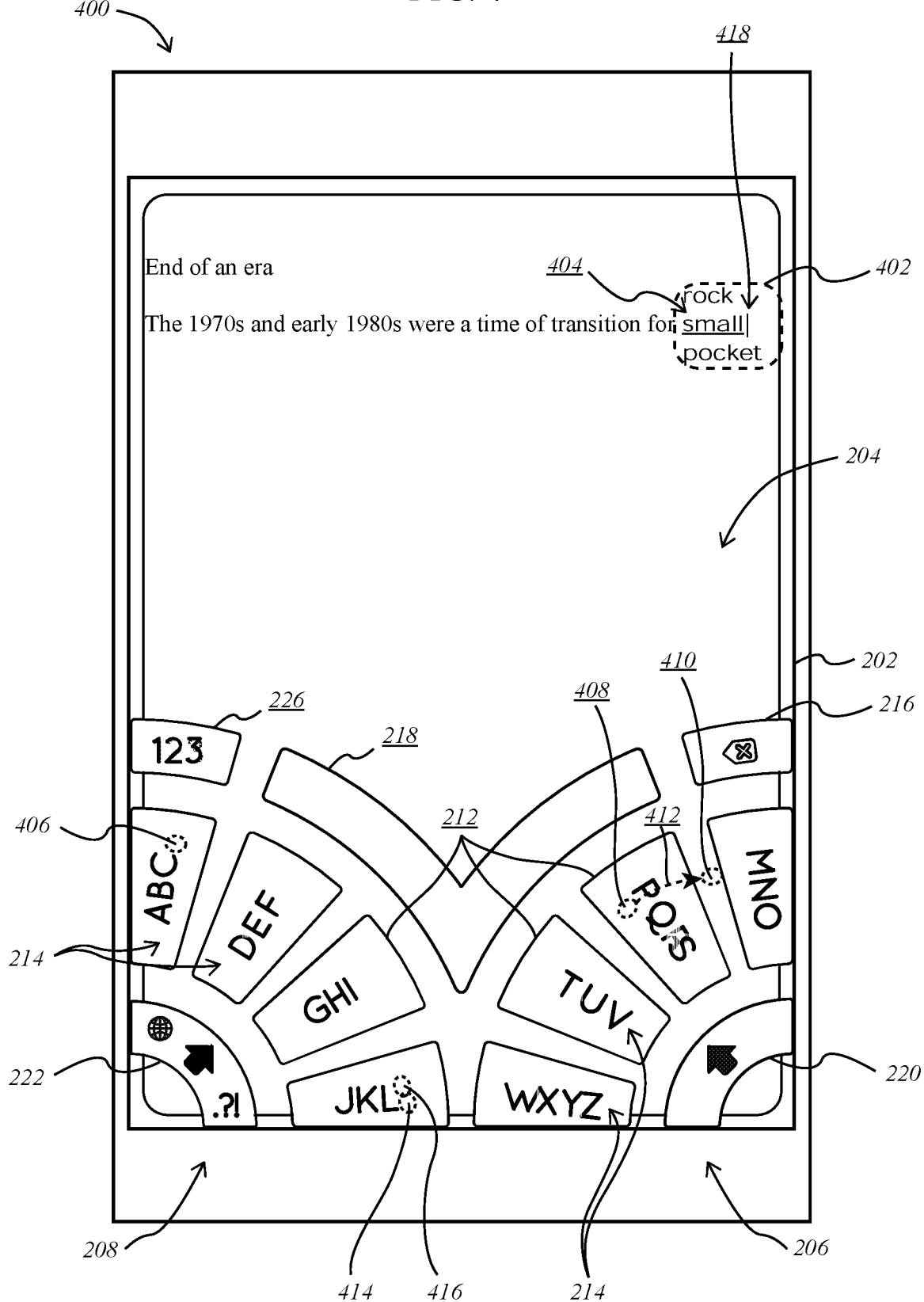
FIG. 4 is a face side view of a touch-sensitive display having groups of virtual ambiguous keys, in accordance with one embodiment.

It should be noted that the gesture may transition approximately circumferentially about the center point from the starting location to the ending location, e.g., see FIG. 4.

However, in other various approaches, at least one of the determined characters of the first of the virtual ambiguous keys may be determined in response to the starting location of the gesture being located on the first virtual ambiguous key, and the ending location of the gesture being located at a different location on the first virtual ambiguous key. Moreover, the at least one of the determined characters of the first of the virtual ambiguous keys may be determined in response to determining that the gesture did not extend beyond the first virtual ambiguous key, e.g., see FIGS. 6.

Accordingly, in one approach, the gesture may include an inward directed flick gesture, e.g., the gesture extending along the first virtual ambiguous key in a direction towards the center point. In another approach, the gesture may include an outward directed flick gesture, e.g., along the first virtual ambiguous key in a direction away from the center point.

Operation 120 of method 100 includes determining at least one character from at least one of the virtual ambiguous keys selected by the gesture. In various approaches, such a determination may be made in response to accessing a known database/list and/or outputting identifying information such as a sequence of locational points for further determining.

As illustrated in FIG. 1, the determined at least one character selected by the gesture may be output on the display, e.g., see operation 121.

Of course, such swiping gestures can be repeated at any time, for any number of times. In other words, once a gesture mode is enabled, in some approaches, such gestures may be used for any period of time, e.g., until the gesture mode is disabled. Accordingly, operations 120-121 may also be performed in response to detecting such swipe gestures.

Referring again to the flick gesture mode, e.g., see operation 110, according to various approaches, a flick gesture may be a swipe gesture with relatively moderate length. In various present approaches, the descriptive name "flick" may refer to the fact that these type of swipe gestures are determined and/or configured to be input swiftly, e.g., relatively faster than swipe gestures are configured to be and/or determined to be input.

In one approach, one or more flick area may be output on the display in response to the flick gesture mode being enabled. Such flick areas may divide the area of one or more virtual ambiguous keys, e.g., see FIGS. 5-6. In one approach, each of the characters of the first virtual ambiguous key may be bordered by flick borders which thereby separate different flick areas. Accordingly, such flick borders may also be output on the display. For example, flick borders may also be output on the display in response to detecting that a gesture trespasses a predetermined tap area surrounding the starting location of the gesture, where the starting location of the gesture is located at a center of the predetermined tap area. In other approaches, each flick area may be associated to one set of characters, e.g., each set having two or more characters associated therewith.

Accordingly, flick areas may be used to for determining at least one character from at least one of the virtual ambiguous keys. For example, in one approach, each of the characters of a first and a second virtual ambiguous key may be bordered by flick borders, e.g., each flick border thereby defining at least two flick areas within a virtual ambiguous key. Accordingly, the starting location of the gesture may be located on a first flick area, and the ending location of the gesture is located on a second flick area. Accordingly, such locations and/or any trespassing of flick areas and/or borders there-between (by the gesture) may be used for determining at least one character from at least one of the virtual ambiguous keys.

It should be noted that such borders and/or flick area may be selectively output on the display in response to detecting any event. For example, in one approach, indications of each of the flick areas of the first virtual ambiguous key may be displayed in response to detecting a touch event on the first virtual ambiguous key of the touch-sensitive input area of the display. Moreover, indications of each of the flick areas of the second virtual ambiguous key may be displayed in response to detecting the gesture trespass, e.g., leave, a contour of the first virtual ambiguous key.

Accordingly, in some approaches, in response to detecting such trespass events, at least one character associated with the trespassed flick area may be determined, e.g., see various operations 111.

Such determined character(s) may be output on the display, e.g., see operation 118.

In preferred approaches, a previous set of determined characters may be forgotten and/or deleted from the display in response to detecting an inward directed flick gesture, and the flick gesture mode being currently enabled.

It should be noted that using gestures for determining at least one character from at least one of the virtual ambiguous keys for outputting to on the display may significantly improve typing speeds and typing accuracies of users typing on a text input device performing method 100. Accordingly, the usability of such text input devices will also improve. Such beneficial improvements result for a number of reasons, as will now be detailed.

First, in sharp contrast to conventional keyboards, each of the output characters determined using various approaches and/or embodiments described herein do not need to be individually selected. This is because in some cases, a single gesture may be used to determine potentially more than one character from at least one of the virtual ambiguous keys. This results in less individual keystrokes from having to be processed. Moreover, with less keystrokes being made, inaccuracies that might otherwise result from a greater number of keystrokes being performed may also be avoided. This will correlate to less corrective operations having to be performed on and/or processed by a computer. Accordingly, the processing potential of computers will also improve and/or be preserved for other uses, as a direct result of various embodiments and approaches described herein.

Moreover, because the virtual ambiguous keys are arranged approximately radially about at least one center point (located spaced from the corner of the display (away from the display) at about the position of the thumb joint when engaged in typing on the touch-sensitive input area), a user will not have to adjust his/her grip of the device and/or strain to utilize each of the virtual ambiguous keys. This will result in and enable quicker and more accurate typing. This is not the case with conventional keyboards, which often include only a single character per key, arranged across numerous rows, because users are often forced to adjust handling of a device and/or strain to reach such conventional keys.

Referring again to decision 107, in response to determining that the gesture did not trespass the tap area (as illustrated by the "No" logical path of decision 107) it may be determined whether the gesture is within the tap area, e.g., see decision 112. In one approach, in response to determining that the gesture is within the tap area, e.g., see "Yes" logic of decision 112, the gesture may be forgotten. For example, the gesture may be forgotten because the gesture may be determined to not be a tap. According to one approach, it may be determined that the gesture is within the tap area in response to determining that the starting location of the gesture and the ending location of the gesture are within the tap area. In another approach, a determination may be made that the gesture is within the tap area in response to determining that the gesture did not leave/trespass the tap area.

In response to determining that the gesture is not within the tap area, e.g., the ending location of the gesture and/or a portion of the gesture other than the starting location was not within the tap area or the first virtual ambiguous key, it may be determined whether a gesture swipe mode is currently enabled, e.g., see decision 113.

If the gesture swipe mode is currently enabled (as illustrated by the "Yes" logical path of decision 113) it may be determined whether the gesture trespassed border(s) of one or more other virtual ambiguous keys, e.g., see decision 114.

In one approach, in response to determining that the gesture trespassed one or more borders of other second virtual ambiguous keys (as illustrated by the "Yes" logical path of decision 114), at least one character from at least one of the virtual ambiguous keys trespassed by the gesture may be determined, e.g., see operation 106.

However if it is determined that the gesture did not trespass one or more borders of other second virtual ambiguous keys (as illustrated by the "No" logical path of decision 114), the gesture may be forgotten. Accordingly, operation 101 may thereafter be performed.

Referring again to decision 113, in response to determining that the gesture swipe mode is not currently enabled (as illustrated by the "No" logical path of decision 113) it may be determined whether the gesture flick mode is currently enabled, e.g., see decision 115.

In response to determined that the flick gesture mode is not currently enabled (as illustrated by the "No" logical path of decision 115), the gesture may be forgotten. Accordingly, operation 101 may thereafter be performed.

However in response to determining that the flick gesture mode is currently enabled (as illustrated by the "Yes" logical path of decision 115), it may be determined whether the gesture trespassed a flick border, e.g., a flick border of the first virtual ambiguous key. Such a decision is represented by decision 116 of method 100.

Operation 122 of method 100 includes determine at least one character from at least one of the virtual ambiguous keys selected by the gesture. Operation 122 may be performed in response to determining that the gesture trespassed a flick border.

With continued reference to method 100, it should be noted more than one gesture may be detected at the same time. Accordingly, the touch-sensitive input area may additionally include groups of virtual ambiguous keys arranged approximately radially about a second center point.

Accordingly, method 100 may include detecting a second touch event on the touch-sensitive input area of the display. The second touch event may include a second gesture in the touch-sensitive input area having the groups of virtual ambiguous keys arranged approximately radially about the second center point. Accordingly, as illustrated in FIGS. 2-4, and 7, the touch-sensitive input area of the display may include two respective sets of virtual ambiguous keys arranged approximately radially about the two center points. Each group of the virtual ambiguous keys may preferably be configured for receiving touch events by a different thumb of a user when typing thereon, e.g., one group of virtual ambiguous keys configured for being contacted by the right thumb of the user and the other group of virtual ambiguous keys configured for being contacted by the left thumb of the user. In other approaches, users are welcome to utilize any one or more fingers for typing on the virtual ambiguous keys.

Accordingly, method 100 may include determining at least two characters and/or at least one potential word from at least two of the virtual ambiguous keys selected by the gestures.

Moreover, method 100 may including outputting the determined at least two characters and/or at least one potential word on the display.

Method 100 may additionally include selectively updating characters of one or more of the virtual ambiguous keys. For example, method 100 may include detecting a second touch event on the touch-sensitive input area of the display, where the second touch event is on a predetermined key for updating at least one character of each of predetermined virtual ambiguous keys arranged approximately radially about one of the center points. It should be noted that in approaches with two groups of virtual ambiguous keys and two center points, e.g., see FIG. FIG. 2, either or both of the two groups of virtual ambiguous keys may include a key for updating the characters of the other group of a different group of the virtual ambiguous keys. For example, the virtual ambiguous keys arranged approximately radially about the second center point may include a key for updating the characters of the virtual ambiguous keys arranged approximately radially about the first center point. Alternatively, the virtual ambiguous keys arranged approximately radially about the first center point may include a key for updating the characters of the virtual ambiguous keys arranged approximately radially about the second center point.

Accordingly, method 100 may include outputting updated characters to the display for each of the predetermined virtual ambiguous keys arranged approximately radially about the first center point and/or outputting updated characters to the display for each of the predetermined virtual ambiguous keys arranged approximately radially about the second center point.

Method 100 may moreover include operations for resizing one or more of the virtual ambiguous keys.

For example, in one approach, method 100 includes detecting a second touch event on the touch-sensitive input area of the display. The second touch event may include a second gesture, where detecting the second touch event may include determining a starting location of the second gesture on the touch-sensitive input area, and an ending location of the second gesture on the touch-sensitive input area. In a specific approach, the span of the distance between the starting location and the ending location of the second gesture may be used for determining the updated size of the one or virtual ambiguous keys that are to be resized. It should be noted, that in preferred approaches, the ending location of the second gesture may be at the furthest location that a user's thumb can extend across the display when the user's thumb joint is positioned at about a center point. Accordingly, none of the virtual ambiguous keys would be spaced beyond the reach of the user's thumb (without having to readjust the user's handling of the device on which method 100 is being performed). As described elsewhere herein, a user not having to adjust his/her grip of a device while typing thereon will significantly increase the proficiency of the user when typing thereon. Accordingly, various embodiments described herein are configured to assist user's typing proficiency while learning how to type, and thereafter. Again this is not the case with conventional keyboards, which often include only a single character per key, arranged across numerous rows, because users are often forced to adjust handling of a device and/or strain to reach such conventional keys.

It should be noted that after resizing and/or initially sizing the virtual ambiguous keys, any resizing indicator that might have been previously displayed on a virtual ambiguous key may no longer be displayed or remain displayed, depending on the approach. In other approaches, if desirable, such a resizing indicator may remain displayed on the display.

Accordingly, method 100 may include outputting the groups of virtual ambiguous keys with an updated size in response to the starting location of the second gesture being located at a corner of the touch-sensitive input area of the display, and the ending location of the second gesture being located away from the starting location of the second gesture. In one approach, a difference between the updated size of the groups of virtual ambiguous keys and an original size of the groups of virtual ambiguous keys may correspond to a predetermined scaler of the distance between the starting location and the ending location of the second gesture.

It should be noted that during testing of the various embodiments and approaches described herein, such as method 100, inventors uncovered surprising results. Such surprising results include that during testing, within less than forty-five minutes, or the equivalent of a single school class, testing subjects were able learn and proficiently type on a device with the virtual keyboard described herein implemented thereon. Specifically, the results on ten different testing sessions collectively produced near a twenty-five words per minute typing speed median. In particular, this proficient typing was performed while some of such test subject did not need to look at the keyboard described in various embodiments herein, while engaged in typing thereon.

One of ordinary skill in the art would not expect such a result. This is because it is predicted that learning how to generally use a conventional computer keyboard without looking at the keyboard while typing thereon may take about fifty hours of initial practice. Moreover, such conventional keyboards often require users to use eight to ten fingers to achieve moderate typing speeds. As conventional keyboards with one character per key are condensed onto smaller devices, such as a phone, that force a user to type with thumbs, learning how to type thereon, and moreover how to type efficiently thereon becomes substantially more difficult. In sharp contrast, various embodiments and approaches described herein streamline the process of learning how to efficiently type on an electronic device using a virtual keyboard that utilizes natural thumb movement and unique gestures.

In addition to the surprising results offered by various embodiments described herein, it should be further noted that various embodiments and approaches described herein benefit a global population of people that use electrical devices, such as computers, tablets, hand held touch screen displays, etc.

For example, because the ambiguous keys are spatially larger than conventional keys on a standard QWERTY keyboard, users typing on the ambiguous keys of the present embodiments will have more accurate keystrokes. For example, as described elsewhere herein, the English alphabet includes twenty-six letters, and thus conventional keyboards often include at least twenty-six keys. When typing on a relatively small virtual keyboard, such as on a phone, a user's finger keystrokes often miss their intended target keys. These inaccuracies are time consuming and frustrating for a user to correct. Moreover, when such mistakes are not noticed, the typed content is inaccurate and often requires clarification for a reader. In sharp contrast, the ambiguous keys of embodiments described herein include multiple characters on at least some of the ambiguous keys. Accordingly, with less overall key targets and potentially spatially larger keys than conventional keyboards, various embodiments and approaches described herein will enable improved typing speeds and typing accuracies for users.

Of course, these increased accuracies will result in less processed keystrokes being made, e.g., than would otherwise be made in inaccurately typing on conventional keyboards and then having to correct the typos. This will result in less operations being processed by a computer. Accordingly, the processing potential of computers will also improve as a direct result of embodiments described herein.

Moreover, it should be considered that people who undergo learning how to type are often youth, such as children in schools. Of course, such youth often are responsible for learning much more than how to type while school. For example, students often are assigned to mathematics classes, history classes, science classes, etc. This can be very burdensome to balance all at the same time. Accordingly, using various embodiments and approaches described herein, youth will be able to learn to type on an electronic device more efficiently. This will afford such youth more time to study other important subject, and furthermore, help such youth to, at a young age, develop the skill of typing on an electronic device more quickly than would otherwise be available using conventional keyboards.

FIGS. 2-7 depict various devices 200-700 with virtual ambiguous keys arranged approximately radially about one or more center points, in accordance with various embodiments. As an option, the present devices 200-700 may be implemented in conjunction with features from any other embodiment listed herein, such as those described with reference to the other FIGS. Of course, however, such devices 200-700 and others presented herein may be used in various applications and/or in permutations which may or may not be specifically described in the illustrative embodiments listed herein. Further, the devices 200-700 presented herein may be used in any desired environment.

It should be noted that any one or more of the devices 200-700 may share common numberings, e.g., for similar functionalities and/or displayed portions on the displays.

Figure 2:
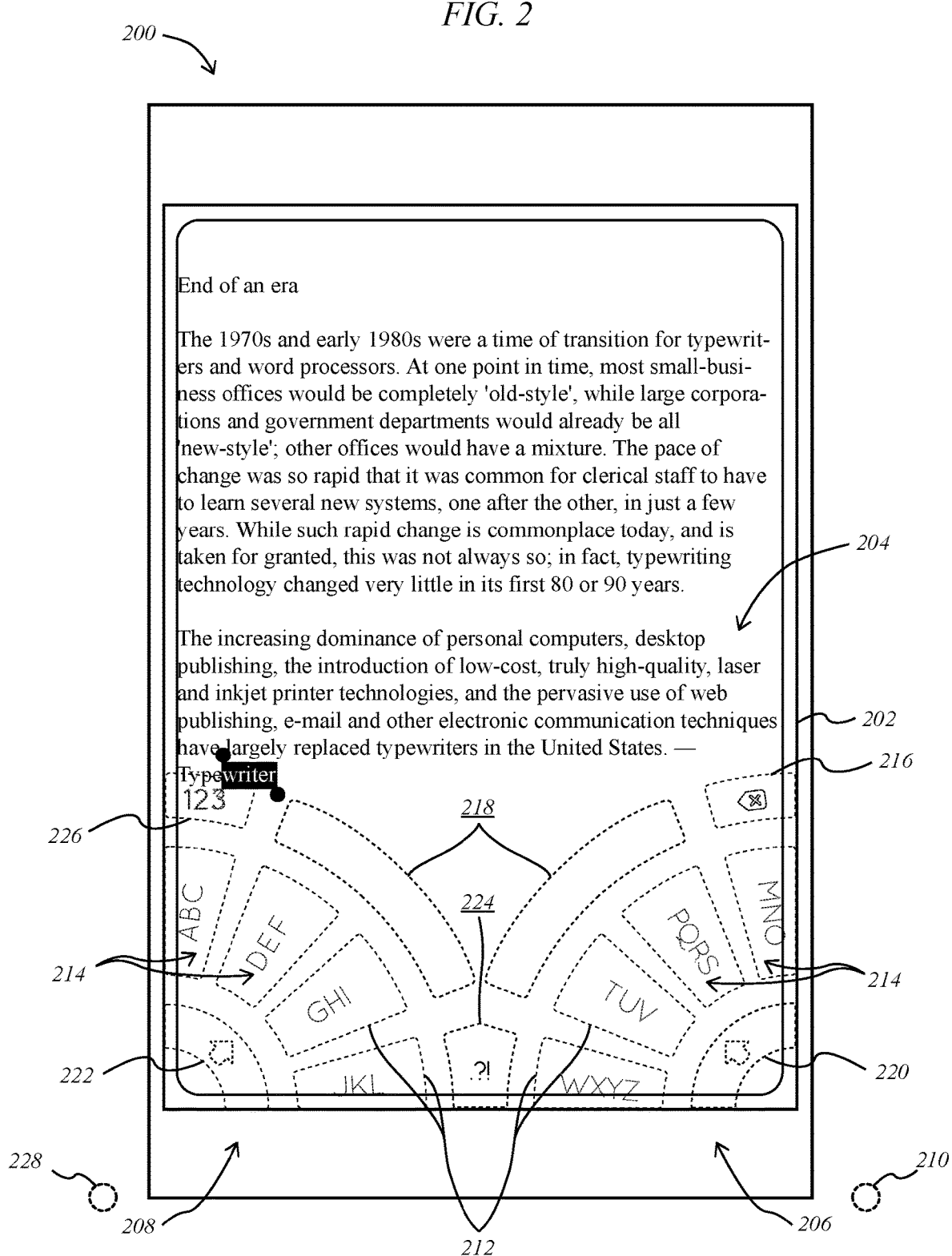
FIG. 2 is a face side view of a touch-sensitive display having groups of virtual ambiguous keys, in accordance with one embodiment.

Referring now to FIG. 2, a display 202 of a device 200 includes a touch-sensitive input area 204. The touch-sensitive input area 204 may include groups of virtual ambiguous keys 212 arranged approximately radially about a center point. For example, the touch-sensitive input area 204 includes a first group 206 of virtual ambiguous keys 212 arranged approximately radially about a first center point 210 and a second group 208 of virtual ambiguous keys 212 arranged approximately radially about a second center point 228. In FIG. 2 there are fifteen virtual ambiguous keys in total, however, as described elsewhere herein, the total number of virtual ambiguous keys 212 output on the display may change at any time, e.g., based on a resizing event occurring, based on an updating of the characters of the virtual ambiguous keys 212, based on an enabling and/or disabling of the swipe and/or flick modes, etc. It should be noted that the first and second center points 210, 228 are illustrated in FIG. 2 for purposes of an example only (and omitted from FIGS. 3-7 for purposes of brevity). This is because in various approaches the center points 210, 228 may not be visible to a user, but rather be descriptive references of points that the groups 206, 208 of virtual ambiguous keys 212 are arranged approximately radially about. Moreover, the center points 210, 228 are provided for purposes of an example in FIG. 2, and thus center points described herein should not be interpretively limited thereto. In other words, different configurations of other virtual ambiguous keys that would be apparent to one skilled in the art upon reading the descriptions may change the location of such center points. However, it should again be noted that a center point is preferably located spaced from a corner of a display at about the position of the thumb joint when engaged in typing on the touch-sensitive input area of the display.

It should be noted that the touch-sensitive input area 204 may be any portion of the display, or in some approaches, the entire display 202. Accordingly, in preferred approaches the display 202 is touch-sensitive.

The center points 210, 228 may be spaced from corners of the display 202 at about the position of the thumb joint of a user when engaged in typing on the touch-sensitive input area 204, or any of the other relative center point locations described elsewhere herein.

Each of the virtual ambiguous keys 212 may include at least one character 214. However some of the virtual ambiguous keys 212 designated for particular functions may not include any characters, as will now be described.

Moreover, in various approaches, some virtual ambiguous keys 212 may correspond to particular functions. For example, the touch-sensitive input area 204 of the present approach includes a delete virtual ambiguous key 216, a space and/or select displayed characters virtual ambiguous key 218, one or more keys (220, 222, 224, 226) that may be used for updated characters and/or type of characters of one or more virtual ambiguous keys of at least one of the groups 206, 208, initiating a shift function (virtual ambiguous key 222), initiating a control function, etc. Accordingly, for descriptive purposes, it should be noted that while such keys were originally referenced as "virtual ambiguous keys 212," these keys with specific functions are numbered in FIG. 2 with specific numbers for descriptive purposes, e.g., specifically referencing such keys.

Moreover, as described in method 100, one or both of the groups 206, 208 of virtual ambiguous keys 212 may be resized.

In such updating, the starting location of a resizing gesture may be anchored to a bottom corner edge of the touch-sensitive input area 204. In some approaches, when the resized size of the groups 206, 208 of virtual ambiguous keys 212 are big enough, some virtual ambiguous keys 212 may overlap each other, e.g., see the merging of the virtual ambiguous key 218 in FIG. 3. In some approaches, in response to such overlapping, one or more virtual ambiguous keys may disappear, or at least portions thereof. Of course the functionalities of the virtual ambiguous keys that disappear may be transitioned to other keys. In other embodiments, the overlapping virtual ambiguous keys may be partially or entirely merged. For example, in FIG. 2, the virtual ambiguous key 224 may be merged from what was formerly two virtual ambiguous keys (not shown).

It should be noted that the virtual ambiguous keys 212 of FIG. 2 are dashed to illustrate that in some approaches, some or all of the virtual ambiguous keys 212 may be at least temporarily omitted from the display 202. This may be for eye-free typing, e.g., such as when the user is familiar with and has memorized the layout of the virtual ambiguous keys and/or the approximate locations of such keys previously output on the display 202.

It should be noted that this capability of various embodiments and/or approaches described herein may be particularly useful in approaches in which the virtual ambiguous keys are output to the display 202, and any determined characters and/or words are output to a different display (not shown), e.g., such as a display that the display 202 is paired with via hardwire or wirelessly (now shown). Accordingly, at least temporarily omitting the virtual ambiguous keys from the display 202 and/or turning off visual displays of the display 202 (with continued tap and gesture capabilities remaining enabled thereafter) may assist in preserving a battery of the display 202.

With continued reference to FIG. 2, in one approach each of the groups 206, 208 of virtual ambiguous keys 212 may include three circumferential rows of virtual ambiguous keys 212, as shown, however, in other approaches, the groups 206, 208 of virtual ambiguous keys 212 may include any number, e.g., one, two, four, five, etc., of circumferential rows of virtual ambiguous keys 212, each having any number of virtual ambiguous keys 212. The groups 206, 208 of virtual ambiguous keys 212 each include three circumferential rows of virtual ambiguous keys 212 may be preferred, because a user can easily remember the thumb stances for that amount of rows in each of the groups 206, 208. In a preferred embodiment, as illustrated in FIG. 2, there may be one virtual ambiguous keys 212 in each of the first rows (the rows closest to the respective center points 210, 228), four virtual ambiguous keys in the second row and three virtual ambiguous keys in the third row. It should be noted that it may be preferable to not include more than four virtual ambiguous keys in a single row, e.g., for retaining eyes-free handling/usage. Thus a user can easier identify/remember each virtual ambiguous keys even without visually looking at the groups 206, 208 of virtual ambiguous keys 212.

Figure 3:
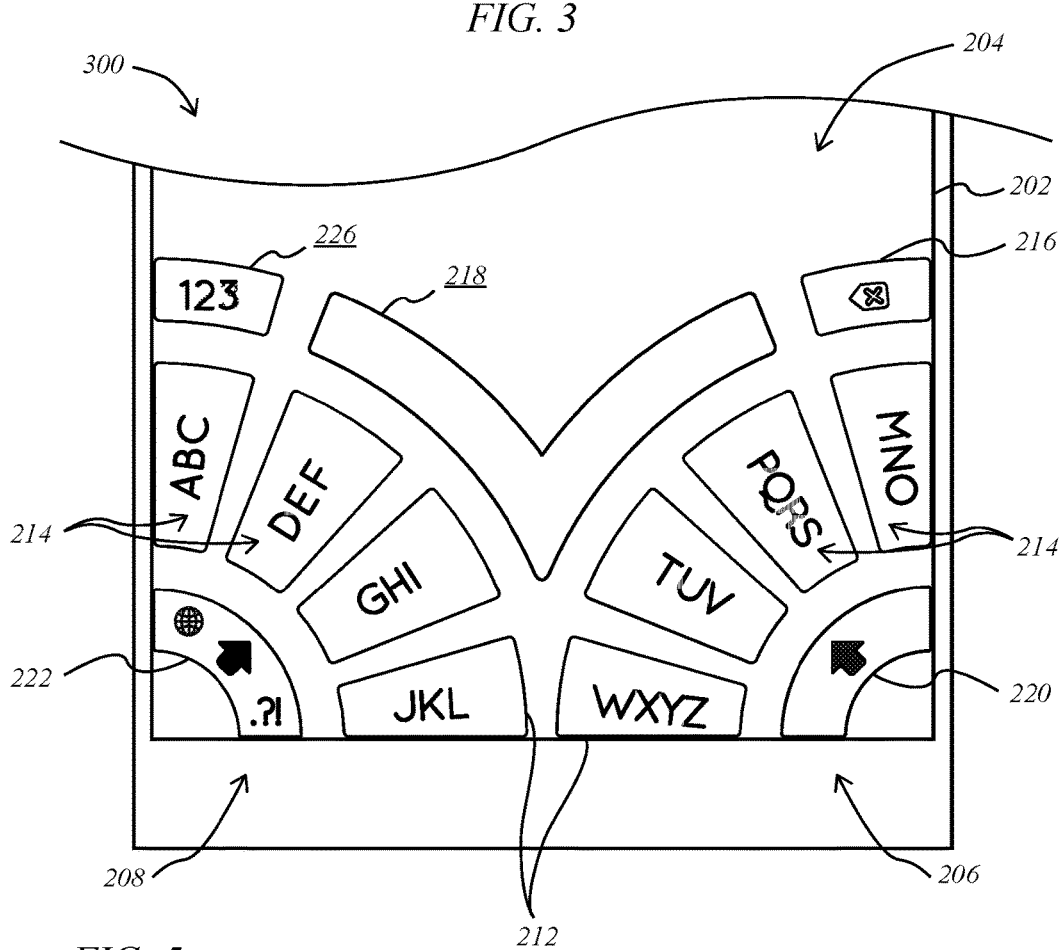
FIG. 3 is a partial face side view of a touch-sensitive display having groups of virtual ambiguous keys, in accordance with one embodiment.

Referring now to FIG. 3, it should be noted that the virtual ambiguous key 224 of FIG. 2 does not appear on display 202 of the device 300 in FIG. 3, in response to at least one of the groups 206, 208 of virtual ambiguous keys 212 being resized. Moreover, in response to the resizing event, space and/or select displayed characters' virtual ambiguous key 218 (which was previously divided into two keys in FIG. 2) is displayed as a single merged key.

Accordingly, in the present approach, the ".?!" functionalities of the former virtual ambiguous key 224 (see FIG. 2) has been reassigned to the shift virtual ambiguous key 222 in FIG. 3. Accordingly, a subsequent tap event occurring on the shift virtual ambiguous key 222 may select the functionalities that were previously assigned to the now non-displayed virtual ambiguous key 224.

Moreover, in one approach, the now merged space and/or select displayed characters virtual ambiguous key 218 has the same functionality as two separate space keys, e.g., the difference is solely visual.

Moreover, in one approach, the groups 206, 208 of virtual ambiguous keys 212 may be resized (enlarged) to a maximum size, where the maximum size is at the point where the virtual ambiguous keys 212 containing the characters "JKL" and "WXYZ" would merge.

Referring now to FIG. 4, an option selector menu 402 is displayed at an output location 418 at which text (at least one character and/or word determined by a gesture) is currently being output on a display 202 of the device 400. Of course, the location at which text is currently being output on a display 202 of the device 400 may change at any time, e.g., in accordance with a received touch event, in accordance with at least one determined character being output on the display 202, etc.

In various approaches, the option selector menu 402 includes a main option 404 in a central position. The main option 404 displays the selected option of available words and/or strings of characters which may correspond to a determination of at least one character 214 from at least one of the virtual ambiguous keys 212 selected by a gesture. For example, in one approach, the word "small" of the option selector menu 402 may correspond to a detected touch event, which in the present example may include a swipe gesture 412 and a plurality of tap gestures 406, 414, 416. Specifically note that the characters "S" and "M" of the displayed word "small" are determined by the swipe gesture 412 (with a swipe gesture mode enabled) having a starting location 408 of the swipe gesture 412 on the virtual ambiguous key 212 containing the character "S" and the ending location 410 of the swipe gesture 412 not being located on the virtual ambiguous key 212 containing the character "S." It should be noted that the character "M" was determined based on the swipe gesture 412 transitioning from the starting location 408 of the swipe gesture 412 transitioning approximately circumferentially about a center point to the ending location 410 of the swipe gesture 412, toward a second virtual ambiguous key. Note that the second virtual ambiguous key in the present swipe gesture example, is the virtual ambiguous key containing the "S" character. Moreover, although the ending location 410 of the swipe gesture 412 is not specifically on the virtual ambiguous key containing the "S" character, the characters "sm" are determined based on the swipe gesture 412, and thereafter output on the display 202.

Accordingly, the remaining determined string of characters "all" of the word "small" are determined in response to detecting the tap gestures 406, 414, 416.

In this approach, when trespassing a most previous virtual ambiguous key, the determined characters may be determined in response to accessing a known database or list of, e.g., characters, words, known relationships between detected touch events and characters, etc. For example, in one approach, the order in which the characters "S" and "M" were selected may be used in such a determination, and may refer to any combination of "p", "q", "r", "s" and "m", "n", "o" in that particular order. Moreover, similarly, the order in which the "A" "L" and "L" characters were selected by the tap gestures 406, 414, 416 may be used in a determination of the characters "all." Such a determination may refer to any combination of "a", "b", "c" and "j", "k", "1" and "j", "k", "l" in that particular order. A controller and/or processor of the computer on which such operations are being performed, e.g., see method 100, may output a list of words determined from the gestures on the display 202, e.g., on the option selector menu 402. Such determinations may be processed and/or evaluated in accordance with predetermined disambiguation methods. Accordingly, a most probable word option corresponding to the gestures, e.g., "small," may be determined. Such databases and/or lists may be customizable and/or adjustable, e.g., such as in accordance with more frequently determined characters or words.

Note that in the present example, the words "rock" and "pocket" are also output on the display 202 within the option selector menu 402. Accordingly, the words "rock" and "pocket" may also correspond to the detected touch event.

One or more desired word options of the option selector menu 402 may be selected and thereafter displayed in the display 202, e.g., selected in response to detecting a touch event on the space and/or select displayed characters virtual ambiguous key 218.

It should be noted that such databases and/or lists of known words may be updated at any time. For example, words or series of characters that do not exist in such databases and/or lists of known words may be added to such databases and/or lists of known words. Accordingly, in some approaches, at least one particular virtual ambiguous key may be used for at least temporarily updating, e.g., for the next predetermined number of gestures, permanently, etc.

such words or series of characters into the databases and/or lists of known words. Of course, if words or strings of characters are accidentally added to such databases and/or lists of known words, such entries may be thereafter amended or forgotten.

Moreover, in some approaches, one or more words and/or series of characters may be categorized into one or more contexts which may thereafter be selectively used in a determining of at least one character from at least one of the virtual ambiguous keys selected by the gesture. For example, words and/or one or more series of characters that relate to mathematical terminology may be added to a database and/or list having a mathematical context. Accordingly, in response to determining and/or receiving indication that database and/or list having a mathematical context should be used in a subsequent determining of at least one character from at least one of the virtual ambiguous keys selected by a gesture, such a context may be utilized for increasing the accuracy of determined words and/or characters output to on the display, e.g., see FIG. 4. Of course such contexts may be selectively disabled at any time.

Figure 5:
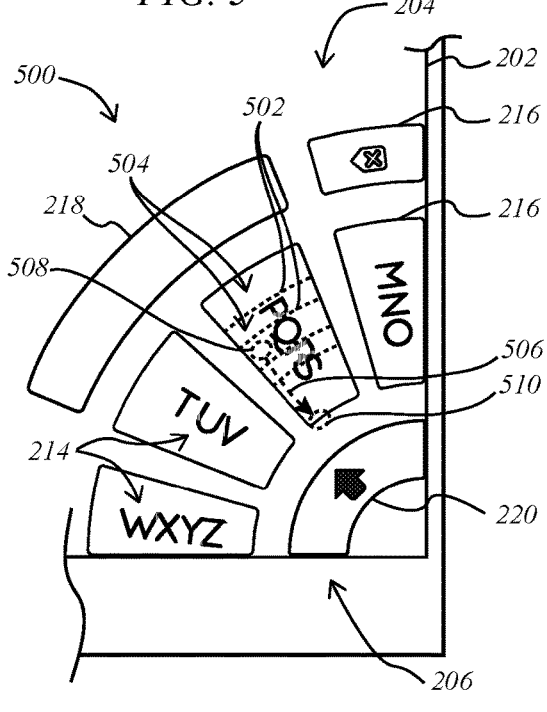
FIG. 5 is a partial face side view of a touch-sensitive display having groups of virtual ambiguous keys, in accordance with one embodiment.

Referring now to FIG. 5, a display 500 is illustrated displaying a first group 206 of virtual ambiguous keys 212.

Each of the characters 214 of the "PQRS" virtual ambiguous key 212 are bordered by flick borders 502 which thereby establish different flick areas 504.

FIG. 5 moreover illustrates a flick gesture 506, with a starting location 508 and an ending location 510. In the present approach, the flick gesture 506 extends in an inward radial direction from the flick area 504 of the "Q" character to the flick area 504 of the "S" character. It should be noted that the circle of the starting location 508 may substantially resemble a tap area that may have been forgotten in response to the flick gesture 506 trespassing the tap area.

Accordingly, in the present approach, the flick gesture 506 may be used in determining that the "s" character should be output on the display 202. In some approaches it may additionally and/or alternatively be determined (from the gesture) that the characters "r" and/or "s" are to be output on the display 202. Accordingly, a command for erasing a previously output set of characters (in this example the "r" character) may be output for updating the display 202.

Moreover, it may be determined that the most probable option of the input sequence (based on the flick gesture 506) is the word "so." Accordingly, in some approaches, the present flick gesture 506 may be used for determining the characters "so," which may thereafter be output on the display 202.

Figure 6:
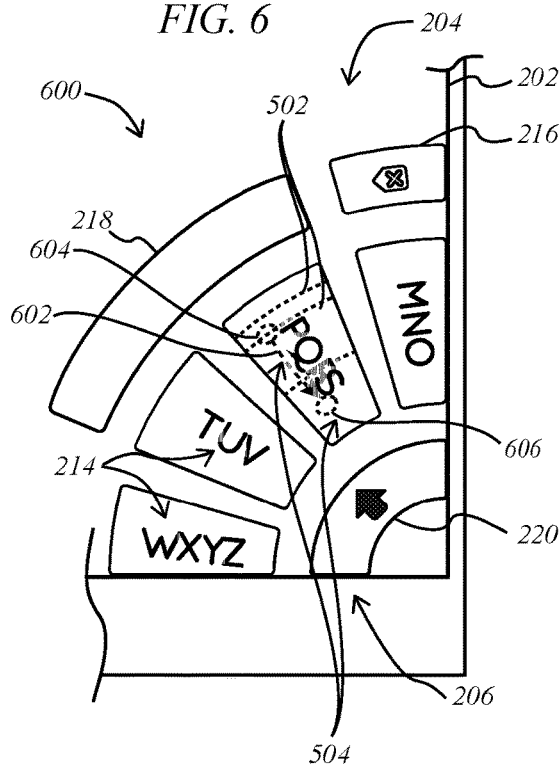
FIG. 6 is a partial face side view of a touch-sensitive display having groups of virtual ambiguous keys, in accordance with one embodiment.

Referring now to FIG. 6, device 600 includes a similar illustration to that of FIG. 5, with different flick borders and flick areas.

For example, note that two flick borders 502 on either side of the "PQ" characters establish a single flick area 504 for the "PQ" characters. Moreover, a starting location of the flick gesture 602 extends from a starting location 604 on a flick border of the "PQ" characters to an ending location 606 that is located on the flick area of the "S" character, which may be used for determining the characters/word "so," which may thereafter be output on the display 202.

Figure 7:
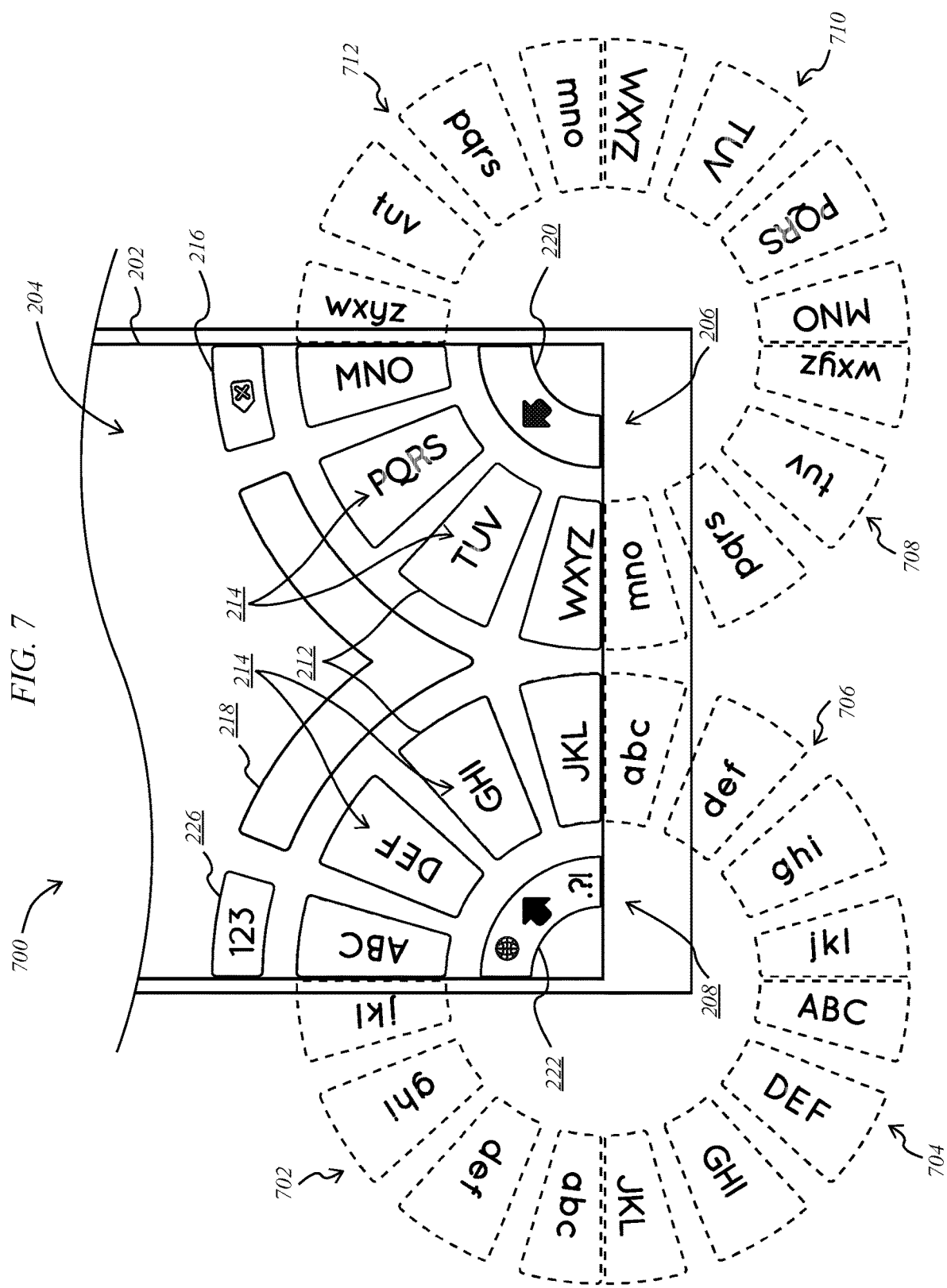
FIG. 7 is a partial face side view of a touch-sensitive display having groups of virtual ambiguous keys, in accordance with one embodiment.

Referring now to FIG. 7, a display 700 is illustrated to include representations of groups of characters that are not currently displayed on virtual ambiguous keys 212, but may be used for updating the characters 214 of the virtual ambiguous keys 212.

For example, in one approach, in response to detecting a tap event on a shift virtual ambiguous key 222 the characters 214 of a first group 206 of the virtual ambiguous keys 212 may be updated. In one approach, characters of any of the groups 708, 710, 712 of available characters may be output for the updating.

In another example, in response to detecting a tap event on a virtual ambiguous key 220 the characters 214 of a second group 208 of the virtual ambiguous keys 212 may be updated. In one approach, characters of any of the groups 702, 704, 706 of available characters may be output for the updating.

It should be noted that each of the groups 702-712 preferably include characters for four virtual keys. For example, in the present approach, every four dashed keys (thereby representing that such characters are not currently displayed) of each of the groups 702-712 alter character case between uppercase and lowercase characters, e.g., characters "mno" "pqrs" "tuv" "wxyz" of the group 712, "abc" "def" "ghi" "jkl" of the group 702, "ABC" "DEF" "GHI" "JKL" of the group 704, etc. In one approach, altering of the character case of characters between uppercase and lowercase may be automatically performed in response to determining that the current word or string of characters begin a new sentence, in response to determining that the current word or string of characters follow the first word of a sentence, etc.

Moreover, in another approach, a selection of character case, e.g., uppercase or lowercase, may be made in response to the tap event including a predetermined pattern of taps. For example, a detected double-tap on a virtual ambiguous key used for altering the character case of one or more virtual ambiguous may lock the corresponding character thereafter for any period of time and/or until detecting a different character case selection.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
presenting, a word option selector menu on a display,
wherein the display is configured to display predicted sets of characters based on received ambiguous characters, unambiguous characters, and a context of a received text input,
wherein the display includes a touch-sensitive input area,
wherein the touch-sensitive input area includes a split keyboard displayed thereon,
wherein the split keyboard includes two substantially quadrant shaped portions,
wherein each of the quadrant shaped portions are about a quarter of a circle,
wherein center points of the quadrant shaped portions are each located at about a different respective bottom corner of a substantially flat plane of the touch-sensitive input area,
wherein each of the quadrant shaped portions include a plurality of virtual command keys and four virtual ambiguous keys to which a plurality of characters are pre-assigned;
detecting, on the touch-sensitive input area, a swipe gesture over a first of the virtual command keys, wherein the first of the virtual command keys corresponds to a space command, wherein the swipe gesture is a touch event exceeding a spatial threshold and temporal threshold on a touch-sensitive input area of the device;
in response to detecting the swipe gesture, selecting the previous or next predicted word in a predetermined list of the word option selector based on a circumferential direction of the swipe gesture; and
in response to detecting a termination of the swipe gesture on one of the virtual space keys, outputting the selected word to a predetermined portion of the display.

2. A method as recited in claim 1, comprising:
detecting, on the touch-sensitive input area, a tap gesture over a second of the virtual command keys, wherein the tap gesture is a touch event with a relatively low temporal and radial spatial threshold on the touch-sensitive input area; and
in response to detecting the tap gesture, outputting an ambiguous character assigned to the second virtual ambiguous key to the list of the word option selector.

3. A method as recited in claim 1, comprising:
detecting, on the touch-sensitive input area, a tap gesture over a second of the virtual command keys; and
in response to detecting the tap gesture, performing a command pre-associated with the second virtual ambiguous key.

4. A method as recited in claim 1, comprising:
detecting, on the touch-sensitive input area, a swipe gesture over a second of the virtual command keys; and
in response to detecting the swipe gesture, outputting to the list of the word option selector, at least one character of each virtual ambiguous key that the swipe gesture is detected to traverse.

5. A method as recited in claim 1, wherein the plurality of characters pre-assigned to the eight virtual ambiguous keys include:
"ABC", "DEF", "GHI", "JKL", "MNO", "PQRS", "TUV", and "WXYZ," disregarding order, case or diacritics of the plurality of characters.

6. A method as recited in claim 1, comprising:
detecting, on the touch-sensitive input area, a flick gesture over a second of the virtual command keys, wherein the flick gesture includes a continuous, single-direction, relatively spatially short touch event on the touch-sensitive input area; and
in response to detecting the flick gesture, outputting a character from the set of characters assigned to the second ambiguous key to the list of the word option selector, wherein the character from the set of characters assigned to the second ambiguous key is based on a radial direction of the flick gesture in relation to the center points and a length of the flick gesture.

7. A method as recited in claim 1, comprising:
detecting, on the touch-sensitive input area, a flick gesture on or out of a border of a second virtual ambiguous key that is configured to delete text from the display, wherein the flick gesture is initially detected at about a circular portion of the border if the second virtual ambiguous key; and in response to detecting that the flick gesture is substantially circumferential centered around a circle center point of a substantially quadrant shaped portion, performing a deletion command on a word preceding or subsequent to a text entry point on the display, wherein the deletion command is based on a determined circumferential direction of the flick gesture; and in response to detecting an upwards flick gesture on or out of the border of the second virtual ambiguous key, performing a deletion command on a paragraph preceding the text entry point.

8. A method as recited in claim 1, comprising:

detecting, on the touch-sensitive input area, a command that is configured to initialize a mode to resize the split keyboard;

in response to detecting the command, initiating a keyboard resizing mode;

detecting, on the touch-sensitive input area, a second command; and in response to detecting the second command, resizing quadrant shaped portions equally, wherein the keyboard adopts a size set therein, wherein affected virtual buttons are replaced with substitute virtual keys in response to a determination that various displayed virtual keys of the portions overlap as a result of the resizing.

9. A method as recited in claim 8, comprising detecting, on the touch-sensitive input area, a long touch gesture over a virtual resizing key at about the circular border of a portion;

in response to detecting the command, initiating a keyboard resizing mode; and in response to detecting the second command, resizing quadrant shaped portions equally, wherein the keyboard adopts a size set therein, wherein affected virtual buttons are replaced with substitute virtual keys in response to a determination that various displayed virtual keys of the portions overlap as a result of the resizing.

10. A method as recited in claim 1, wherein the word option selector is displayed subsequent to the text entry point.

11. A method as recited in claim 1, comprising presenting, on a touch-sensitive display a split keyboard, wherein the split keyboard includes two substantially quadrant shaped portions, wherein each of the quadrant shaped portions are about a quarter of a circle, wherein center points of the quadrant shaped portions are each located at about their respective corners no farther than one inch from neither the bottom edge relative to the display direction and/or orientation, nor from either one of the side edges relative to the display direction and/or orientation of a substantially flat plane of the display.

12. A method as recited in claim 1, comprising presenting, on a touch-sensitive display a split keyboard, wherein the split keyboard includes two substantially quadrant shaped portions, wherein each of the quadrant shaped portions are about a quarter of a circle, wherein center points of the quadrant shaped portions are each located within one inch from respective side edges of a substantially flat plane of the touch-sensitive input area, and may be located not at about the bottom edge of the flat plane of the touch-sensitive input area.

13. A method as recited in claim 1, wherein the plurality of characters pre-assigned to the eight virtual ambiguous keys include:

"ABC", "DEF", "GHI", "JKL", "MNO", "PQRS", "TUV", and "WXYZ," disregarding order, case or diacritics of the plurality of characters, and comprising:

detecting, on the touch-sensitive input area, a tap gesture over a second of the virtual command keys, wherein the tap gesture is a touch event with a relatively low temporal and radial spatial threshold on the touch-sensitive input area;

in response to detecting the tap gesture, outputting an ambiguous character assigned to the second virtual ambiguous key to the list of the word option selector;

detecting, on the touch-sensitive input area, a tap gesture over a second of the virtual command keys;

in response to detecting the tap gesture, performing a command pre-associated with the second virtual ambiguous key;

detecting, on the touch-sensitive input area, a swipe gesture over a second of the virtual command keys;

in response to detecting the swipe gesture, outputting to the list of the word option selector, at least one character of each virtual ambiguous key that the swipe gesture is detected to traverse;

detecting, on the touch-sensitive input area, a flick gesture over a second of the virtual command keys, wherein the flick gesture includes a continuous, single-direction, relatively spatially short touch event on the touch-sensitive input area;

in response to detecting the flick gesture, outputting a character from the set of characters assigned to the second ambiguous key to the list of the word option selector, wherein the character from the set of characters assigned to the second ambiguous key is based on a radial direction of the flick gesture in relation to the center points and a length of the flick gesture;

detecting, on the touch-sensitive input area, a flick gesture on or out of a border of a second virtual ambiguous key that is configured to delete text from the display, wherein the flick gesture is initially detected at about a circular portion of the border if the second virtual ambiguous key;

in response to detecting that the flick gesture is substantially circumferential centered around a circle center point of a substantially quadrant shaped portion, performing a deletion command on a word preceding or subsequent to a text entry point on the display, wherein the deletion command is based on a determined circumferential direction of the flick gesture;

in response to detecting an upwards flick gesture on or out of the border of the second virtual ambiguous key, performing a deletion command on a paragraph preceding the text entry point;

detecting, on the touch-sensitive input area, a long touch gesture over a virtual resizing key at about the circular border of a portion;

in response to detecting the command, initiating a keyboard resizing mode; and in response to detecting the second command, resizing quadrant shaped portions equally, wherein the keyboard adopts a size set therein, wherein affected virtual buttons are replaced with substitute virtual keys in response to a determination that various displayed virtual keys of the portions overlap as a result of the resizing.

14. A computer program product, comprising: a computer readable storage medium having stored thereon computer readable program instructions configured to cause a processor of a computer system to:
present, a word option selector menu on a display,
wherein the display is configured to display predicted sets of characters based on received ambiguous characters, unambiguous characters, and a context of a received text input,
wherein the display includes a touch-sensitive input area,
wherein the touch-sensitive input area includes a split keyboard displayed thereon,
wherein the split keyboard includes two substantially quadrant shaped portions,
wherein each of the quadrant shaped portions are about a quarter of a circle,
wherein center points of the quadrant shaped portions are each located at about a different respective bottom corner of a substantially flat plane of the touch-sensitive input area,
wherein each of the quadrant shaped portions include a plurality of virtual command keys and four virtual ambiguous keys to which a plurality of characters are pre-assigned;
detect, on the touch-sensitive input area, a swipe gesture over a first of the virtual command keys,
wherein the first of the virtual command keys corresponds to a space command,
wherein the swipe gesture is a touch event exceeding a spatial threshold and temporal threshold on a touch-sensitive input area of the device;
in response to detecting the swipe gesture, select the previous or next predicted word in a predetermined list of the word option selector based on a circumferential direction of the swipe gesture; and
in response to detecting a termination of the swipe gesture on one of the virtual space keys, output the selected word to a predetermined portion of the display.

15. A computer program product as recited in claim 14, wherein the plurality of characters pre-assigned to the eight virtual ambiguous keys include:
"ABC", "DEF", "GHI", "JKL", "MNO", "PQRS", "TUV", and "WXYZ," disregarding order, case or diacritics of the plurality of characters.

16. A computer program product as recited in claim 14, the computer readable program instructions configured to cause the processor of the computer system to:
detect, on the touch-sensitive input area, a long touch gesture over a virtual resizing key at about the circular border of a portion;
in response to detecting the command, initiate a keyboard resizing mode; and
in response to detecting the second command, resize quadrant shaped portions equally, wherein the keyboard adopts a size set therein, wherein affected virtual buttons are replaced with substitute virtual keys in response to a determination that various displayed virtual keys of the portions overlap as a result of the resizing.

17. A system, comprising:
a display, wherein the display includes a touch-sensitive input area for touch events;
a processor; and
logic integrated with and/or executable by the processor, the logic being configured to output on the touch-sensitive input area of the display:
present, a word option selector menu on the display,
wherein the display is configured to display predicted sets of characters based on received ambiguous characters, unambiguous characters, and a context of a received text input,
wherein the touch-sensitive input area includes a split keyboard displayed thereon,
wherein the split keyboard includes two substantially quadrant shaped portions,
wherein each of the quadrant shaped portions are about a quarter of a circle,
wherein center points of the quadrant shaped portions are each located at about a different respective bottom corner of a substantially flat plane of the touch-sensitive input area,
wherein each of the quadrant shaped portions include a plurality of virtual command keys and four virtual ambiguous keys to which a plurality of characters are pre-assigned;
detect, on the touch-sensitive input area, a swipe gesture over a first of the virtual command keys,
wherein the first of the virtual command keys corresponds to a space command,
wherein the swipe gesture is a touch event exceeding a spatial threshold and temporal threshold on a touch-sensitive input area of the device;
in response to detecting the swipe gesture, select the previous or next predicted word in a predetermined list of the word option selector based on a circumferential direction of the swipe gesture; and
in response to detecting a termination of the swipe gesture on one of the virtual space keys, output the selected word to a predetermined portion of the display.

18. A system as recited in claim 17, the logic being configured to:
detect, on the touch-sensitive input area, a swipe gesture over a second of the virtual command keys; and
in response to detecting the swipe gesture, output to the list of the word option selector, at least one character of each virtual ambiguous key that the swipe gesture is detected to traverse.

* * * * *